US010540101B1

United States Patent
Matthews et al.

(10) Patent No.: US 10,540,101 B1
(45) Date of Patent: Jan. 21, 2020

(54) TRANSMIT BUFFER DEVICE FOR OPERATIONS USING ASYMMETRIC DATA WIDTHS

(71) Applicant: Innovium, Inc., San Jose, CA (US)

(72) Inventors: William Brad Matthews, San Jose, CA (US); Patrick James Bourke, San Bruno, CA (US); Puneet Agarwal, Cupertino, CA (US); Michael John Filardo, Los Gatos, CA (US); Mohammad Kamel Issa, Los Altos, CA (US); Avinash Gyanendra Mani, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 106 days.

(21) Appl. No.: 15/667,299

(22) Filed: Aug. 2, 2017

(51) Int. Cl.
*G06F 3/06* (2006.01)

(52) U.S. Cl.
CPC ............ *G06F 3/0617* (2013.01); *G06F 3/065* (2013.01); *G06F 3/068* (2013.01); *G06F 3/0619* (2013.01); *G06F 3/0641* (2013.01); *G06F 3/0659* (2013.01)

(58) Field of Classification Search
CPC .... G06F 3/0617; G06F 3/0619; G06F 3/0641; G06F 3/065; G06F 3/0659; G06F 3/068
See application file for complete search history.

(56) References Cited

U.S. PATENT DOCUMENTS

| | | | | |
|---|---|---|---|---|
| 9,838,500 | B1* | 12/2017 | Ilan | H04L 67/2852 |
| 2015/0312160 | A1* | 10/2015 | Griswold | H04L 49/351 370/412 |
| 2016/0226797 | A1* | 8/2016 | Aravinthan | H04L 49/3027 |
| 2017/0153852 | A1* | 6/2017 | Ma | G06F 3/0604 |

\* cited by examiner

*Primary Examiner* — Reginald G Bragdon
*Assistant Examiner* — Edward Wang
(74) *Attorney, Agent, or Firm* — Fish & Richardson P.C.

(57) ABSTRACT

Methods and apparatus for transmit buffers for network devices. One apparatus includes a packing unit, a buffer manager and a plurality of aggregated port buffers, each coupled to receive output from the packing unit. The packing unit is configured to receive packet data as input segments of a first size; generate storage units of a second size; and write each storage unit to a particular aggregated port buffer identified by the buffer manager. The buffer manager is configured to: select a particular aggregated port buffer for each storage unit, and send information to the buffer manager about the selected particular aggregated port buffer; monitor availability of storage space in the aggregated port buffers; control reception of input segments based on storage space availability; and manage transmission of the storage units from the aggregated port buffers to one or more external destinations as output segments of a third size.

30 Claims, 4 Drawing Sheets

TRANSMIT BUFFER DEVICE FOR OPERATIONS USING ASYMMETRIC DATA WIDTHS

BACKGROUND

This specification relates to transmit buffer devices.

Some network devices include an output port buffer, which receives interleaved packet data destined for many output ports and buffers the data separately for each output port for subsequent transmission through the respective ports to external destinations.

SUMMARY

This specification describes a transmit buffer for network devices having a number of innovative aspects and related technologies. The transmit buffer can be used in place of a conventional output port buffer included in some network devices, e.g., network switches. In some implementations, the transmit buffer supports read or write operations, or both, that use asymmetric data widths. In some implementations, the transmit buffer maximizes throughput by using a credit-based flow control approach to control the rate at which data is sent to the transmit buffer by external sources. The transmit buffer packs the packet data into internal blocks of data, which are referred to as storage units, by appending packet data from multiple arrivals to match certain size boundaries. The packing approach employed by the transmit buffer results in maximum utilization of the available storage space in the buffer, while simultaneously providing high throughput and ensuring that there is no data overflow.

The transmit buffer services ports in groups of ports, which are referred to as port groups. A port in this context corresponds to a transmission channel that is associated with a pair of source and destination devices. Different ports are associated with different transmission channels and the different ports process data for different destinations. By buffering data separately for port groups, the transmit buffer can support different data rates in a port group with a single buffer. The transmit buffer can dynamically reconfigure non-active ports in a port group during runtime, while enabling transmission of data on other active ports.

In addition to a transmit buffer, a network device as described above includes an aggregated packet processor upstream of the transmit buffer. The aggregated packet processor receives the packet data from external sources as input segments, and forwards a stream of the interleaved input segments to the transmit buffer.

The subject matter described in this specification can be implemented in particular embodiments so as to realize one or more of the following advantages. The transmit buffer provides simultaneous read access at the output of the buffer and write access at the input to the buffer, while limiting the cost of hardware through the use of components such as single-port memories for the memory banks in the aggregated port buffers, which are relatively inexpensive compared to multi-port memories. The support for packet data of variable sizes and the read and write access techniques implemented by the transmit buffer ensure that there is no buffer overflow, while sustaining high throughput. The data packing mechanisms employed by the transmit buffer leads to maximum utilization of the storage space in the buffer. In this manner, the transmit buffer ensures that the amount of buffering needed is reduced while avoiding buffer overflow. The transmit buffer supports a range of output port configurations, and also allows that the configuration of output ports in a port group can be dynamically changed during runtime. In some implementations, the transmit buffer provides egress duplication or mirroring of packet data. The transmit buffer enables mirroring of all the packet data, or selected portions of the packet data.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements. Various embodiments shown in the figures are merely illustrative representations and are not necessarily drawn to scale.

DETAILED DESCRIPTION

Figure 1:
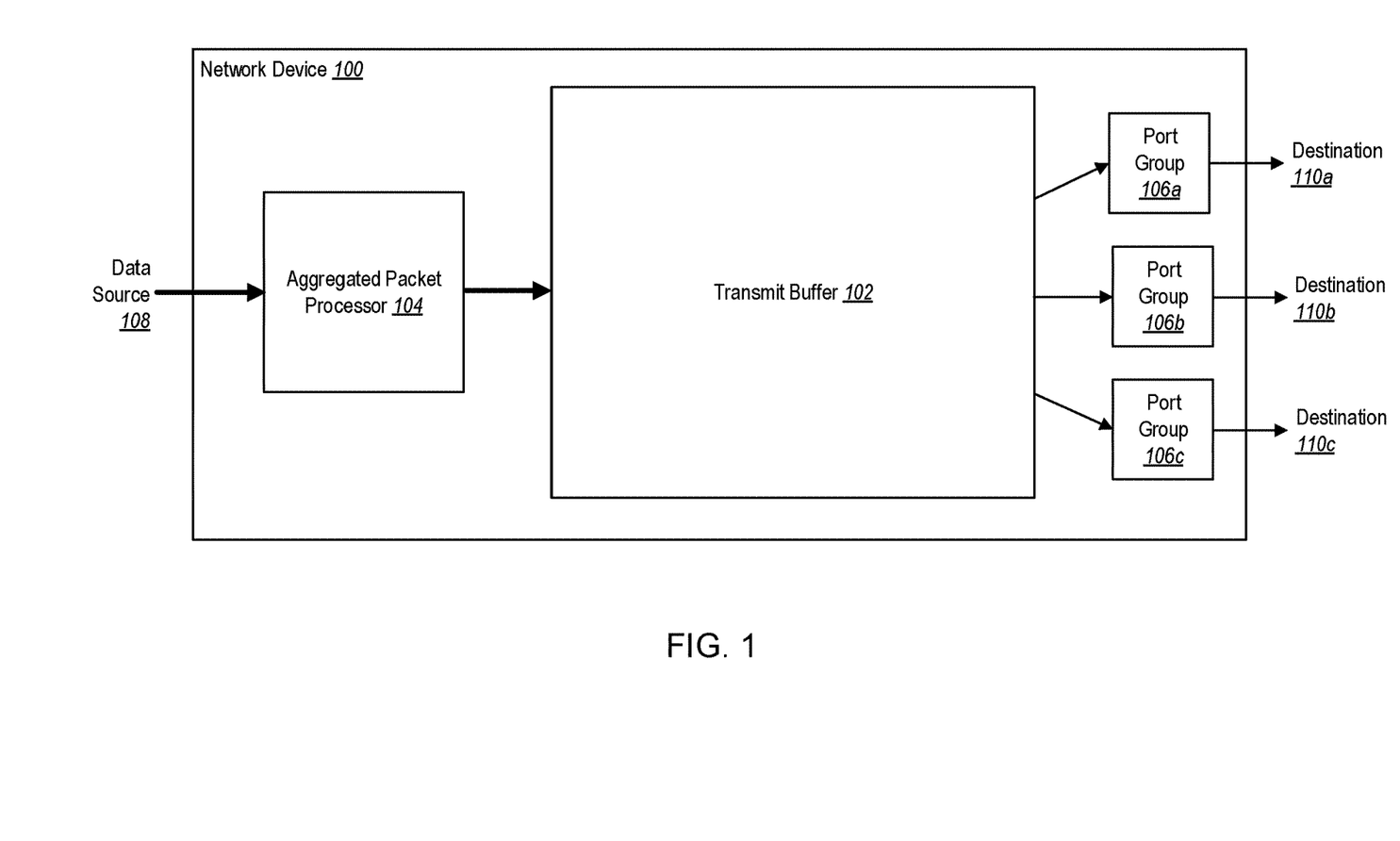
FIG. 1 illustrates an example network device that includes a transmit buffer.

FIG. 1 illustrates an example network device 100 that includes a transmit buffer 102, an aggregated packet processor 104, and one or more port groups, e.g., port groups 106a, 106b and 106c. The network device 100 receives packet data from a data source, e.g., data source 108, buffers the data and forwards the buffered data to respective destinations, e.g., destinations 110a, 110b and 110c.

In some implementations, the network device 100 is a component of a larger device that includes the data source 108. For example, the network device 100 can be a portion of a network switch e.g., an Ethernet switch, which also includes the data source 108. In some other implementations, the network device 100 is a network switch and the data source 108 is external to the network switch. In either case, the network device 100 performs forwarding operations on packet data at very high speeds, e.g., potentially on the order of tens of thousands of bits per second (Gbps), with high efficiency, e.g., minimum buffering and no buffer overflow in the device.

The transmit buffers, aggregated packet processors, and port groups described in this specification can be implemented in a number of technologies. For example, a transmit buffer includes components that can be implemented using combinational logic circuitry, e.g., logic gates, flip-flops and registers. A transmit buffer also includes memory components that can be implemented using memory chips or fabricated on one integrated circuit with the rest of the transmit buffer. An aggregated packet processor can be implemented as a programmed microprocessor, a programmed microcontroller, an application-specific integrated circuit (ASIC), or a programmed processor core or set of processor cores on a larger integrated circuit. A port group can include physical ports or logical ports. A port group includes a set of serializer/deserializer (SERDES) lanes operating at a particular rate, e.g., 10 Gbps, 25 Gbps, 50 Gbps, or 100 Gbps each. A physical port is associated with one or more SERDES lanes. For example, a 100 Gbps port can be associated with ten 10 Gbps lanes, four 25 Gbps lanes, two 50 Gbps lanes, or one 100 Gbps lane, depending on the underlying SERDES technology used. Similar to a physical port, a logical port is also associated with a destination; however, a logical port includes multiple physical connections to the destination. A logical port can be represented as one or more physical ports. A logical port can be bound to one or more aggregate port buffers. This specification will describe operations performed by these and related components in various implementations of the components, and refer to the components as being "configured to" perform the operations. This should be understood to mean that the components include hardware, firmware, software, circuitry, or a combination of them that in operation cause the components to perform the operations.

The aggregated packet processor 104 receives packet data from the data source 108. In some cases, the data source 108 includes a management function that utilizes a scheduler to arbitrate access to the aggregated packet processor 104. The data source 108 processes packet data of varying sizes and generates input segments that are sent to the aggregated packet processor 104, which forwards a stream of interleaved input segments to the transmit buffer for temporary storage, before the data are transmitted to the respective destinations through the ports in the port groups 106a, 106b or 106c.

In some implementations, the network device 100 includes more than one aggregated packet processor 104. The multiple aggregated packet processor can service multiple data sources 108. In such cases, the operations of the multiple aggregated packet processors are synchronized with one another. The multiple aggregated packet processors 104 receive packet data from one or more data sources, and forward the data after processing to the transmit buffer 102.

The transmit buffer 102 separates out the interleaved packet data received from the aggregated packet processor 104 and buffers data destined for separate port groups separately. As described in greater detail below, the transmit buffer includes logic circuitry and storage memory for processing and storing the interleaved packet data received from the aggregated packet processor 104.

A port group includes one or more ports. In some implementations, different port groups have different numbers of ports. For example, port group 106a can have a single port; port group 106b can have four ports; and port group 106c can have 10 ports. The ports in a port group can be changed during runtime, while traffic is being transmitted through other port groups. For example, port group 106a can initially include four ports, each of data rate 10 Gbps. During runtime, the port group 106a can be reconfigured to include two ports, each of data rate 20 Gbps, or one port with data rate 30 Gbps and the second port with data rate 10 Gbps. Alternatively, the port group 106a can be reconfigured to include three ports, one port with data rate 20 Gbps, and each of the remaining two ports with data rate 10 Gbps.

Each port group 106a, 106b and 106c is associated with a different destination. For example, port group 106a is associated with destination 110a; port group 106b is associated with destination 110b; and port group 106c is associated with destination 110c. In some implementations, the destination is another network device, e.g., another Ethernet switch, or a peripheral device, such as a packet processor. The physical components of, and the operations performed by, a transmit buffer 102 are described below.

Figure 2:
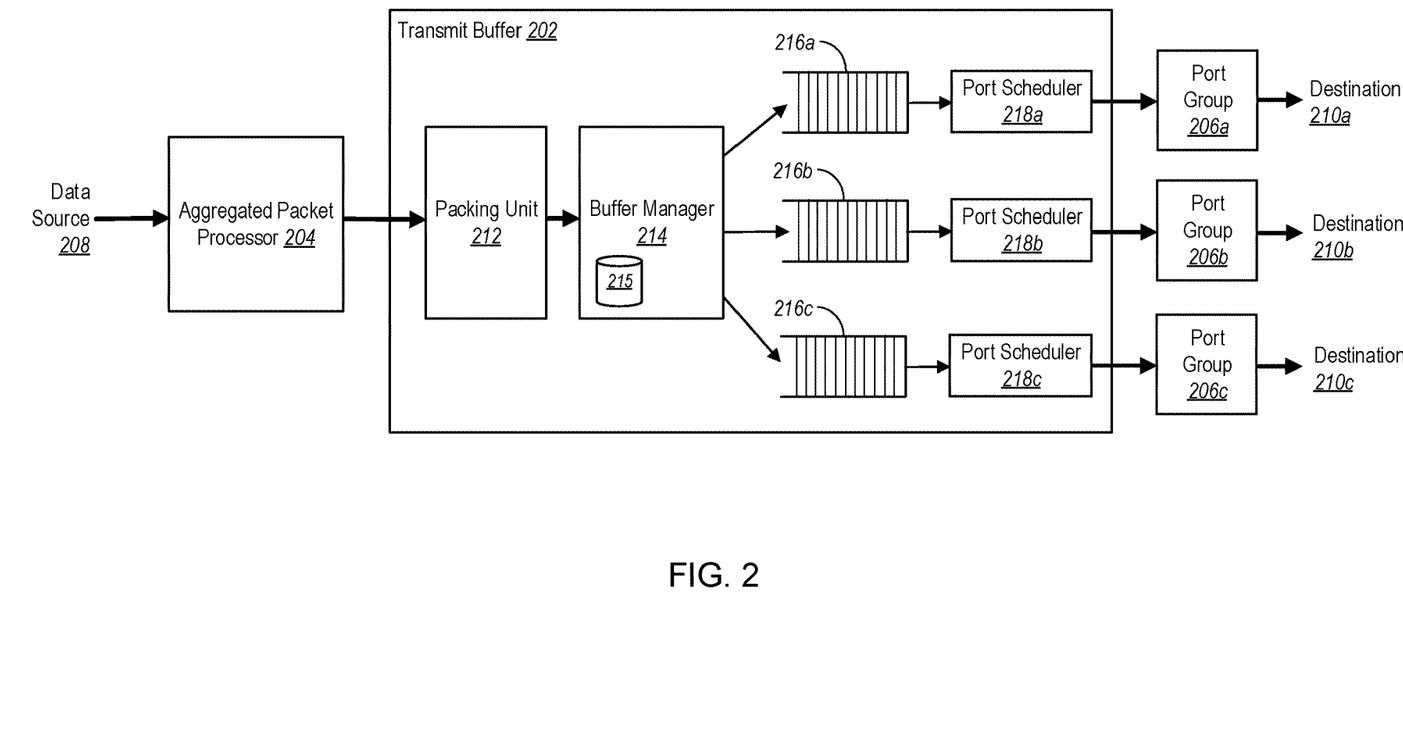
FIG. 2 illustrates an example transmit buffer device that is coupled to an aggregated packet processor and one or more port groups.

FIG. 2 illustrates an example transmit buffer device 202 that is coupled to an aggregated packet processor 204 and one or more port groups 206a, 206b and 206c. The transmit buffer device 202, which is also referred to as transmit buffer 202, includes a packing unit 212; a buffer manager 214; one or more aggregated port buffers 216a, 216b and 216c; and one or more port schedulers 218a, 218b and 218c.

As shown and described in greater detail below, the aggregated packet processor 204 receives packet data from a data source 208 for multiple transmission channels, and sends interleaved packet data to the transmit buffer 202. The packing unit 212 receives the interleaved packet data from the aggregated packet processor 204 as input segments at an input of the transmit buffer 212. In some implementations, the packing unit 212 receives interleaved packet data from multiple aggregated packet processors at one or more input interfaces of the transmit buffer 202.

An output of the packing unit 212 is coupled to an input of the buffer manager 214. The packing unit sends internal blocks of data, which are referred to as storage units, to the buffer manager 214, where the storage units are generated based on processing the input segments at the packing unit 212. The buffer manager 214 is coupled to the aggregated port buffers 216a, 216b and 216c at outputs of the buffer manager 214. The buffer manager 214 coordinates transfers of the storage units from the packing unit 212 to the aggregated port buffers 216a, 216b and 216c for buffering, based on the port groups for which the storage units are destined. In some implementations, data flows, e.g., transfer of storage units from the packing unit to the aggregated port buffers, is based on control provided by the buffer manager.

As shown, in some implementations, each aggregated port buffer is coupled to a separate and distinct port scheduler, and these two components together service a separate and distinct port group. For example, an output of the aggregated port buffer 216a is coupled to an input of the port scheduler 218a, and an output of the port scheduler 218a is coupled to the port group 206a; an output of the aggregated port buffer 216b is coupled to an input of the port scheduler 218b, and an output of the port scheduler 218b is coupled to the port group 206b; and an output of the aggregated port buffer 216c is coupled to an input of the port scheduler 218c, and an output of the port scheduler 218c is coupled to the port group 206c. Each port scheduler, e.g., each port scheduler 218a, 218b and 218c, coordinates data transfers from the corresponding aggregated port buffer to the corresponding port group. Each port scheduler schedules transmission of storage units buffered by the corresponding aggregated port buffers, e.g., aggregated port buffers 218a, 218b and 218c respectively, to ports in the corresponding port group, e.g., port groups 206a, 206b and 206c respectively. However, in other implementations, more than one aggregated port buffer is coupled to a port scheduler, and a port scheduler may service more than one port group, or a port group may be serviced by more than one port scheduler. In some implementations, a port group controls the data flow to a particular port by controlling scheduling of the port at the corresponding port scheduler. The data are forwarded through the ports in the port groups to various destinations 210a, 210b and 210c.

In some implementations, the transmit buffer 202 is similar to the transmit buffer 102; the aggregated packet processor 204 is similar to the aggregated packet processor 104; and the port groups 206a, 206b and 206c are similar to the port groups 106a, 106b and 106c respectively. The data source 208 is similar to the data source 108, while the destinations 210a, 210b and 210c are similar to the destinations 110a, 110b and 110c respectively.

In greater detail, the aggregated packet processor 204 receives packet data for multiple ports from the data source 208. The data source 208 provides the packet data as input segments of size S, where S is an integer $>0$, to the aggregated packet processor 204. For example, the data source 208 can receive a packet of size 1024 bytes, divide the packet into eight input segments of 128 bytes each (here S=128 bytes), and send the input segments to the aggregated packet processor 204. The data source 208 can receive packets of other sizes as well, and divide packets of varying sizes into input segments of size S. The aggregated packet processor 204 forwards interleaved packet data to the packing unit 212 in the transmit buffer 202.

The packing unit 212 divides input segments into storage units of size M each, where M is an integer. The storage units are forwarded to the buffer manager 214 for storage in the aggregated port buffers 216a, 216b, or 216c. Each aggregated port buffer includes one or more memory banks. In some implementations, the value of M depends on the size of a memory bank. For example, in some implementations a memory bank can hold data in units of 32 bytes. In such cases, each storage unit is 32 bytes (M=32 bytes). Accordingly, the packing unit 212 divides an input segment of size 128 bytes into four storage units, each of size 32 bytes. Alternatively, each memory bank can hold data in units of 64 bytes. In such cases, each storage unit is 64 bytes (M=64 bytes), and the packing unit 212 divides an input segment of size 128 bytes into two storage units, each of size 64 bytes. Other values of sizes of the storage unit are also possible.

In some implementations, the packing unit 212 combines portions of multiple input segments in generating the storage units for maximum efficiency in packing the data. In such implementations, the packing unit includes an internal packing buffer that stores residues of input segments for combining with new input segments that arrive later. For example, the packing unit 212 can receive an input segment of 108 bytes. The packing unit 212 generates, from the 108-byte input segment, three storage units of 32 bytes each, totaling 96 bytes. Accordingly, a residue of 12 bytes from the input segment remains in the packing unit 212. The residue is stored in the packing buffer in the packing unit 212. When a new input segment is received, the packing unit 212 appends the new input segment to the 12-byte residue from the packing buffer, and then splits the result into 32-byte storage units, which are forwarded to the buffer manager 214. The packing unit combines input segments in this manner so that the memory banks in the aggregated port buffers are efficiently packed, e.g., to ensure, to the extent possible, that a memory bank does not store a storage unit that is smaller in size than the unit of storage in the memory bank.

The packing unit 212 combines residues stored in the packing buffer with new incoming input segments that are from the same packet data, or are destined for the same port or the same port group. The packing unit 212 tracks the corresponding packet information, destination ports and/or port groups for each input segment and storage unit.

In some cases, the packing unit 212 stores data in the memory banks without packing storage units as described above. For example, this is the case when the last incoming segment of a packet is received from the aggregated packet processor 204, and the remaining number of bytes in the last segment is not a multiple of the size of the storage unit. In such cases, the packing unit 212 stores the final set of bytes of the packet in a memory bank without packing. For example, the last input segment of a packet may be 112 bytes. The packing unit divides the input segment into three storage units of 32 bytes each. The remainder portion of the input segment is 16 bytes. The packing unit determines that the input segment is the last input segment corresponding to the packet data, and accordingly generates the last storage unit of 16 bytes, which is sent to the buffer manager 214, along with the other regularly sized storage units.

In some implementations, the packing unit 212 is configured to duplicate or mirror packet data. In such implementations, the aggregated packet processor 204 sends, along with the packet data, instructions to duplicate some or all of the packet data. The aggregated packet processor 204 forwards the instructions to the packing unit 212, along with input segments generated from the packet data. In some implementations, the instructions to duplicate packet data are sent by the data source 208, or some other device component coupled to the data source 208, instead of by the aggregated packet processor 204.

The packing unit 212 generates storage units corresponding to the input segments, as described above. Additionally, based on the duplication instructions from the data source 208, the packing unit creates duplicate copies of the storage units. The packing unit 212 forwards the original storage units and the duplicate copies to an aggregated port buffer, based on control instructions from the buffer manager 214.

The buffer manager writes the original storage units to the aggregated port buffer 216a, 216b or 216c corresponding to the destination port for the packet data. The buffer manager 214 writes the duplicate storage units to a different aggregated port buffer, which is specified in the instructions sent by the data source 208. For example, the packet data can be destined for a port in the port group 206a. The buffer manager 214 accordingly writes the original storage units to the aggregated port buffer 216a. However, the instructions from the data source 208 can specify that the duplicate copies are destined for a port in port group 206b. Accordingly, the buffer manager writes the duplicate copies of the storage units to the aggregated port buffer 216b.

In some implementations, packet data is duplicated when additional processing, e.g., packet analysis, is performed on the data. For example, the duplicate copies are sent to a packet analyzer that is coupled to a port in another port group that is separate from the port group for the original packet destination.

In some implementations, for packets that consist of multiple segments, the packing unit 212 creates duplicate copies of a subset of the input segments, e.g., the first input segment that includes packet header information. In other implementations, the packing unit 212 creates duplicate copies of all input segments of a packet, based on the instructions. In such implementations, when writing the duplicate copies of all the input segments to a second aggregated port buffer, the buffer manager 214 tracks the order in which the storage units are written to the aggregated port buffer, such that reads are performed in the same order, as described below. Additionally or alternatively, multiple queues are maintained inside the second aggregated port buffer to maintain the order of the input segments within the packet. This ensures that the packet data is not misordered during reads. In some implementations, the duplicate copies of the input segments are written to a different port in the same port group as the original destination port.

In some implementations, the packing unit 212 is implemented as combinational logic circuitry, e.g., using logic gates, flip-flops and registers. In other implementations, the packing unit 212 includes a programmed microprocessor or microcontroller, or some other suitable logic to perform the operations of the packing unit.

At the output of the transmit buffer 202, data are transmitted to the port groups as output segments of size R, where R is an integer. The data are written to multiple port groups in parallel. In some implementations, the size of a storage unit is equal to the size of an output segment, e.g., M=R. In some implementations, the size of a storage unit is a fraction of the size of an output segment. In such cases, each output segment is a combination of storage units from more than one memory bank. For example, each memory bank in an aggregated port buffer can store in units of size 32 bytes and a storage unit is therefore of size 32 bytes. However, each output segment can of size 64 bytes. Accordingly, each output segment is a combination of two storage units.

In some implementations, the fractional relationship can be expressed as M=R/k, where k is an integer. In this relationship, k represents the number of memory banks in an aggregated port buffer. In the example illustrated above, k=2, such that 64/2=32.

As noted above, each of the aggregated port buffers 216a, 216b and 216c includes a group of k memory banks.

Figure 3:
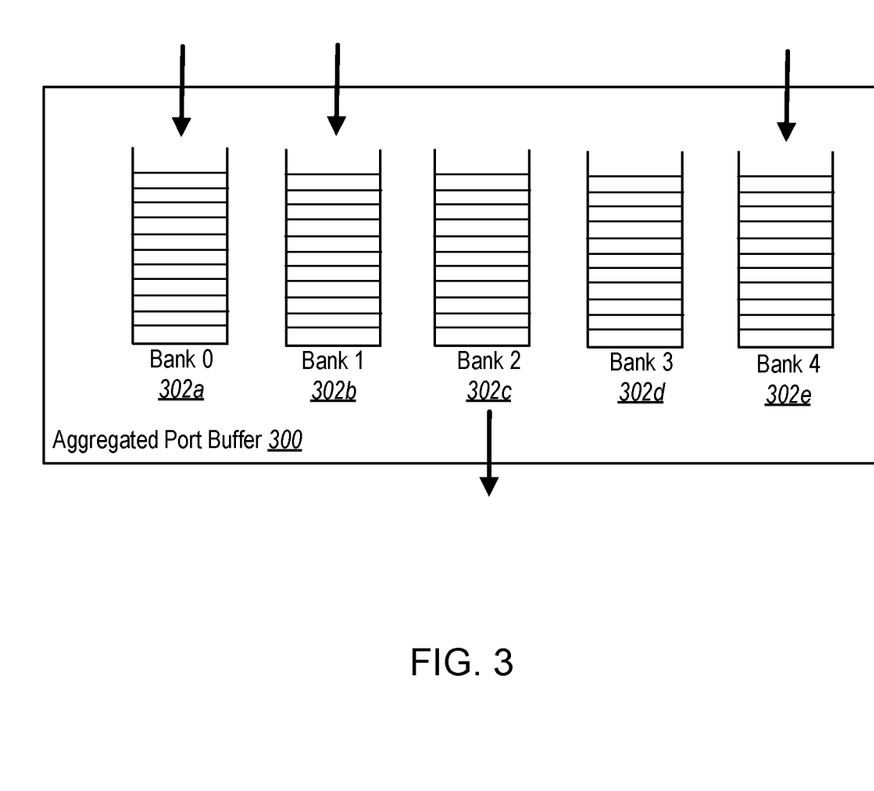
FIG. 3 illustrates an example aggregated port buffer that includes a plurality of memory banks.

FIG. 3 illustrates an example aggregated port buffer 300 that includes multiple memory banks. In some implementations, the aggregated port buffer 300 is an example of one or more of the aggregated port buffers 216a, 216b or 216c.

As shown, the aggregated port buffer 300 includes five memory banks 302a (bank 0), 302b (bank 1), 302c (bank 2), 302d (bank 3) and 302e (bank 4). The number of memory banks can be different in different implementations. For example, in some implementations, the aggregated port buffer 300 includes three, four, six memory banks, among other numbers.

In some implementations, each memory bank 302a, 302b, 302c, 302d and 302e is a single-port memory that is configured to perform one operation per clock cycle, e.g., either a read access or a write access. By using the single-port memory banks, parallel read and write accesses can be performed at the maximum frequency of operation of the network device.

The aggregated port buffer 300 is configured such that a first group of single-port memory banks can be accessed simultaneously for read operations, while a second group of single-port memory banks can be accessed concurrently for write operations. Since each single-port memory allows either a write access or a read access, the first group and the second group are mutually exclusive.

In some implementations, the first group includes one single-port memory bank, while the second group includes the remaining single-port memory banks in the aggregated port buffer. For example, as noted above, in some implementations, R is equal to the size M of a storage unit that is stored in a memory bank, e.g., R=M=32 bytes. In such cases, for each read operation, a storage unit from one memory bank is read as an output segment R. For example, a read access can be performed on bank 302c, while simultaneous write accesses can be performed on banks 302a, 302b, 302d and 302e.

In other implementations, the first group includes more than one memory bank, or the second group includes less than the remaining memory banks in the aggregated port buffer, or both. For example, as noted above, in some implementations, R is a multiple of the size M of a storage unit that is stored in a memory bank. In such cases, for each read operation, storage units from more than one memory bank are read together and combined to form a logical output segment R. For example, in some cases, R=64 bytes while M=32 bytes. In such cases, a read access is performed on two memory banks, e.g., banks 302c and 302d, and the storage units read from the two memory banks are combined into one output segment. Simultaneous write accesses can be performed on the other memory banks, e.g., one or more of 302a, 302b and 302e.

Since multiple write operations can be performed at a time, the amount of data written to the aggregated port buffer 300 can be large, e.g., up to a size S of an input segment. For example, in some implementations, a single memory bank can be accessed in a read operation while data is written to the remaining five memory banks in the aggregated port buffer 300. For storage units of size M=32 bytes, the total data that can be written to the aggregated port buffer 300 in a single write operation is 32*5=160 bytes. In such cases, the transmit buffer can write input segments up to size 160 bytes in each write operation.

A read access, or read request, is performed by a port in a port group that is associated with the aggregated port buffer, while a write access is performed by the buffer manager. For example, considering FIG. 2, the scheduler 218a can issue a read for a port in the port group 206a, which then performs a read on a memory bank in the aggregated port buffer 216a that is associated with the port group 206a, while the buffer manager 214 can perform a write access to the aggregated port buffer 216a.

In some implementations, when performing a read operation, data is read from a memory bank in the order in which the data was previously written to the memory banks, e.g., in first-in-first-out (FIFO) order. As described in greater detail below, the buffer manager tracks the order in which data is written to, and read from, the memory banks in an aggregated port buffer.

The read requests have priority access to the memory banks in the aggregated port buffer 300, compared to the write accesses. During a write operation, the buffer manager writes data to a memory bank that does not conflict with a memory bank from which a read operation is concurrently performed by a port.

In some implementations, each memory bank in the aggregated port buffer 300 is a multi-port memory that can perform more than one operation per clock cycle, e.g., allow multiple read accesses or write accesses, or both. The use of multi-port memory can allow fewer memory instances to be used in exchange for the reduced operating frequency and, potentially, lower throughput and higher power per memory instance. In such implementations, the frequency of operation of the aggregated port buffer can be different than the maximum frequency of operation of the device. For example, an aggregated port buffer that includes multi-port memory banks can be accessed for parallel read and write operations at a frequency lower than the frequency of the aggregated packet processor 204. However, the description in the following sections is with respect to single-port memory banks.

The buffer manager 214 is configured to manage data access to the aggregated port buffers 216a, 216b and 216c for read and write operations. The buffer manager 214 includes, or alternatively is coupled to, a database, which is referred to as a read specification database (RSDB) 215, that is used to maintain the order of reads and writes, as described below.

In some implementations, more than one buffer manager 214 is present in the transmit buffer 202. For example, in some cases, separate buffer managers service the aggregated port buffers 216a, 216b and 216c. The multiple buffer managers are coupled to the output of the packing unit 212. In the following sections, the description is with respect to a single buffer manager 214, with the understanding that the described techniques are also applicable to implementations that include multiple buffer managers.

The buffer manager 214 ensures that each aggregated port buffer stores enough storage units at a time to support the data rate of ports associated with the aggregated port buffer. For example, if a port in the port group 206a has a data rate of 10 Gbps, the buffer manager 214 supplies to the aggregated port buffer 216a storage units corresponding to packet data for the port at a frequency that can support 10 Gbps read rates. The buffer manager manages the supply of storage units for other ports in a similar manner.

In supplying storage units to an aggregated port buffer, the buffer manager 214 also ensures that there is no overflow, e.g., the buffer manager 214 does not send storage units to the aggregated port buffer at a rate that is greater than the rate over a given period of time, at which the ports in the corresponding port buffer can read from the aggregated port buffer. In some implementations, the buffer manager manages the rate at which upstream data is received at the buffer manager, e.g., the rate at which input segments are received from the aggregated packet processor 204, using a write credit management (WCM) technique, as described in greater detail below.

The buffer manager 214 uses the WCM technique or logic to indicate to the upstream data source 208 that it can send data for writing to the one or more of the aggregated port buffers 216a, 216b or 216c. In the WCM technique, the buffer manager grants to each port in a port group, e.g., to each port in the port groups 206a, 206b and 206c, a number of transmission credits, which indicate a maximum number of input segments destined for the port that can be stored at any time in the aggregated port buffer corresponding to the port. In some implementations, the number of transmission credits that are given to each port is based on the target data rate for the port. For example, a port with a data rate of 20 Gbps can have a higher number of transmission credits, e.g., 20 credits to store up to 20 storage units, compared to a port with a data rate of 10 Gbps, e.g., 10 credits to store up to 10 storage units.

The transmission credits for each port are maintained at the upstream source, e.g., data source 208. Initially, the buffer manager 214 provides a fixed number of transmission credits C to the data source 208 corresponding to the number of storage units allocated to a port. In some implementations, transmission credits are maintained separately for duplicated segments. The data source 208 then is allowed to send up to C storage units to the aggregated port buffer associated with the port at a rate desired by the data source 208. The buffer manager 214 determines when a transmission credit can be returned to the data source 208 based on its knowledge of the state of the aggregated port buffer. Every time the data source 208 sends packet data for a port to the transmit buffer 202 through the aggregated packet processor 204, a transmission credit for the port is consumed. In the implementations considered, the data source 208 is responsible for sending packet data for all the ports. Before sending packet data for a port, the data source 208 checks whether transmission credits are available for the port. When all the transmission credits for a port is consumed, the data source 208 cannot send any further packet data for the port, until one or more transmission credits become available again.

The consumption of the transmission credits for a port indicates that storage units destined for the port are occupying space in the aggregated port buffer associated with the port. If the port does not read output segments, and thereby remove the storage units from the aggregated port buffer, as fast as the input segments are sent by the data source 208, then storage units accumulate in the port buffer and the transmission credits are used up, such that sending of the input segments by the data source 208 are stopped when all transmission credits are used up.

When the port reads storage units from the aggregated port buffer, then the buffer space occupied by these storage units are freed up. Using WCM techniques, the buffer manager 214 tracks the amount of space that is allocated to each port in the corresponding aggregated port buffer, and the amount of the allocated space per port that is available. When the amount of space available is sufficient to write storage units corresponding to an input segment for the particular port, then the buffer manager 214 returns transmission credits to the data source 208, indicating that new packet data for the port can be sent.

As an illustrative example, a port in the port group 206a can be allocated 18 transmission credits, indicating that the transmit buffer 202 can buffer up to 18 input segments destined for the port in the aggregated port buffer 216a. In some implementations, the aggregated port buffer 216a includes six memory banks, e.g., as shown by the aggregated port buffer 300. The 18 transmission credits for the port can be spread across the six memory banks, with three transmission credits allocated to each memory bank, indicating that storage units corresponding to up to three input segments for the port can be stored at a time in each memory bank. When one or more transmission credits are available for the port, the data source 208 sends packet data for the port as input segments to the aggregated packet processor 204. If the amount of packet data sent corresponds to one input segment, one transmission credit is consumed. If the amount of packet data sent corresponds to two input segments, two transmission credits are consumed, and so on. The aggregated packet processor 204 sends the input segments to the packing unit 212. The packing unit generates storage units from the input segments, and writes the new storage units to one or more of the available memory banks in the aggregated port buffer 216a. As described previously, the packing unit 212 writes the storage units to the aggregated port buffer 216a based on control instructions from the buffer manager 214. The buffer manager 214 checks which memory banks in the aggregated port buffer 216a have space available, from the space allocated to the port based on transmission credits as indicated above, and accordingly sends control instructions to the packing unit 212. In some implementations, the buffer manager 214 uses a write bank selection (WBS) technique to select the memory banks, as described below.

In the above manner, when storage units corresponding to an input segment for a port are sent by the data source for writing to the aggregated port buffer associated with the port, a transmission credit for the port is consumed. When the port reads storage units corresponding to an output segment, then the storage units are removed from the aggregated port buffer and the space occupied by the storage units becomes available. WCM logic in the buffer manager 214 tracks the availability of buffer space allocated for each port. As soon as sufficient space becomes available to write storage units corresponding to an input segment, the WCM logic triggers the buffer manager 214 to return a transmission credit for the port to the data source 208, e.g., send a notification to the data source 208 indicating that the source can send packet data for one more input segment for the port, thereby incrementing the number of transmission credits for the port at the data source 208.

In some implementations, the buffer manager 214 determines when to return transmission credits to the data source 208 based on certain rules governing the WCM logic. When storage units for a port are written to an aggregated port buffer, but there is no change in the available space allocated for the port for writing input segments, then the buffer manager 214 returns a transmission credit to the data source 208. For example, a port can be allocated four storage units in each memory bank in the aggregated port buffer coupled to the port. Each input segment for the port can be same size as a storage unit, e.g., 64 bytes each. In one write operation, the buffer manager 214 writes one storage unit corresponding to an input segment for the port. However, this write operation does not fully utilize the space allocated for the port, e.g., four storage units, leaving enough free space that the data source 208 can send additional input segments for the port. Accordingly, in this case, the buffer manager 214 returns a transmission credit for the port to the data source 208.

When storage units for a port are written to an aggregated port buffer such that there is an increase in the amount of buffered data for the port and a decrease in the available space allocated to the port, then the buffer manager 214 does not return a transmission credit to the data source 208. When the port reads an output segment, the corresponding storage units in the aggregated port buffer are reduced. When the reduction in storage units equals the size of an input segment, indicating the renewed availability of space to write new storage units corresponding to a new input segment, then the buffer manager 214 returns a transmission credit for the port to the data source 208. On the other hand, when there is no reduction in the storage units upon reading data by the port, and accordingly no renewed availability of space, then the buffer manager 214 does not return a transmission credit for the port to the data source 208.

In some implementations, for duplicated or mirrored copies of data, the buffer manager 214 does not return transmission credits to the data source 208. This is the case, for example, because the mirrored copy was not sent by the data source 208. In such cases, the buffer manager 214 maintains the credit count for the aggregated port buffer space allocated to the mirrored data. When the mirrored data departs from the aggregated port buffer, the transmission credit is returned to the buffer manager.

In this manner, the buffer manager 214 uses WCM to accurately track the space available in the aggregate port buffers, and controls the flow of data such that the data source 208 has an opportunity to write data to the transmit buffer as soon as space is available. In other words, WCM is a flow control technique used by the buffer manager 214 for efficient resource allocation of the storage space in the aggregated port buffers, e.g., aggregated port buffers 216a, 216b and 216c, to ensure maximum utilization of the buffer space.

In some implementations, the number of transmission credits that are assigned to each port is dynamically updated. This can be the case when the ports in a port group are reconfigured, such that the data rate for the ports change. For example, two 10 Gbps ports in port group 206a can be combined to create one 20 Gbps port. Each of the two 10 Gbps ports were assigned 10 transmission credits, indicating that each of the two 10 Gbps ports were assigned storage space for 10 input segments in the memory banks of the aggregated port buffer 216a. Upon reconfiguration to the 20 Gbps port, the buffer manager 214 combines the 10 transmission credits for each of the two 10 Gbps ports, and assigns 20 transmission credits to the 20 Gbps port, thereby reserving storage space for 20 input segments in the memory banks of the aggregated port buffer 216a for the 20 Gbps port, which is proportional to the increased data rate for the 20 Gbps port.

In addition to managing the rate at which upstream data is received, the buffer manager 214 also determines the memory banks in an aggregated port buffer to which storage units are written during a write operation, using a write bank selection (WBS) technique. The WBS selects memory banks to write storage units for an incoming input segment that do not conflict with a memory bank to which a read command is issued, and also attempts to balance the storage load between the memory banks.

The buffer manager 214, using the WBS technique, gives priority to read operations to ensure that ports are allowed to read from the associated aggregated port buffers at their respective data rates, thereby ensuring guaranteed bandwidth. In some implementations, a port scheduler reads zero memory banks in a given clock cycle out of total k memory banks in the associated aggregated port buffer. For example, if a port in the port group 206a is busy with data sent in a prior clock cycle, then the port group 206a flow controls the port scheduler 218a, blocking the port scheduler 218a from sending additional data from the aggregated port buffer 216a to the port group 206a. This results in zero reads for a clock cycle.

In some implementations, a port scheduler reads one or more memory banks in a given clock cycle out of the k memory banks in the associated aggregated port buffer. Considering implementations in which r memory banks are read in one cycle out of a total k memory banks in an aggregated port buffer (r is an integer), the buffer manager 214 selects from the remaining k-max(r) banks to perform write operations. The number of write operations performed in different clock cycles can vary. The buffer manager uses one of several different WBS approaches in selecting up tow memory banks for performing the write operations in a clock cycle, where w is an integer. In some implementations, the WBS technique uses a least-filled-first approach. In this approach, considering implementations in which a single memory bank is read in one cycle (here r=1), the buffer manager 214 selects for writing, from the remaining k−1 memory banks, w memory banks that have the fewest storage units of data stored in them. The least-filled-first approach minimizes the fraction of the total memory in the aggregated port buffer that is unused due to imbalance between the banks.

In the least-filled-first approach, the buffer manager 214 determines, when performing write access to an aggregated port buffer, the number of storage units for the particular destination port that are stored in the memory banks in the aggregated port buffer. In some implementations, the buffer manager uses a high-speed least-filled-first bank selection technique for fast resolution of thew least-filled banks. The high-speed least-filled-first bank selection technique speeds up the cost of writing data to the memory banks, thereby reducing the overall cost, e.g., the corresponding staging cost that would be incurred if the time to reach a decision is extended. The high-speed least-filled-first bank selection technique can also ensure a high degree of accuracy and minimize errors.

The high-speed least-filled-first bank selection technique ranks each memory bank according to its occupancy, e.g., the number of storage units that are stored in the memory bank for a particular port. To determine the rankings, for each memory bank, the number of memory banks with lesser occupancy, e.g., number of storage units stored in a memory bank, are added. Since some of the occupancies are non-unique, for example, when two or more memory banks store a same number of storage units, memory banks with the same occupancy can share the same position. In such cases, the position of each memory bank is adjusted using the identifier for the memory banks to split ties. For example, if memory banks 2, 3 and 4 end up in the same position, e.g., each stores a same number of storage units, the position of memory bank 4 is increased by 2, and the position of memory bank 3 is increased by 1, to make the individual ranks unique. Equation (1) provides an example logic expression that can be implemented in the buffer manager 214 to rapidly evaluate, for example, the rank for memory bank 4 in a 6-bank aggregated port buffer.

$$B4pos=B4gteB1+B4gteB2+B4gteB3+!B5gteB4+ \\ !B6gteB4 \qquad (1)$$

In this equation, B4pos is the rank or position of memory bank 4, gte stands for greater than or equal, and BngteBm is a numerical value that indicates whether the position of memory bank Bn is greater than or equal to the position of memory bank Bm. For example, if the position of memory bank Bn is greater than or equal to the position of memory bank Bm, BngteBm=1; however, if the position of memory bank Bn is less than the position of memory bank Bm, BngteBm=0.

In some implementations, the WBS technique uses a 1-in-N approach (where N is an integer. In this approach, if w−2 is how many storage units need to be written in one write operation, then the buffer manager 214 selects for writing, from the remaining k−1 memory banks, w−1 least-filled memory banks, and then excludes one of the selected w−1 banks at random.

In some implementations, the WBS technique uses a variant of the 1-in-N approach. In this approach, to write a storage unit, the buffer manager 214 determines the two least-filled banks first, e.g., using the fast least-filled-first approach, and then selects one of the two least-filled banks at random.

As noted previously, the buffer manager 214 also controls the order in which storage units are read from memory banks in an aggregated port buffer when being transmitted to ports associated with the aggregated port buffer. The buffer manager 214 includes the read specification database (RSDB) 215, which records the order in which storage units are stored in each aggregated port buffer.

When the buffer manager 214 writes storage units corresponding an input segment for a port in the associated aggregated port buffer, the buffer manager 214 inserts a single read record in the RSDB 215. The read record specifies the memory banks to which the storage units were written, and the order in which the storage units were written to the memory banks. When the storage units are read from the memory banks, the port follows the same order.

As an illustrative example, the buffer manager writes storage units for a port in the port group 206b to memory banks in the aggregated port buffer 216b. In some implementations, the aggregated port buffer 216b includes five memory banks, e.g., similar to the memory banks 302a, 302b, 302c, 302d and 302e, and four storage units are written in each write operation. For a particular write operation, the buffer manager 214 writes the four storage units to memory banks 302e, 302d, 302b and 302a, which are selected, for example, based on the WBS technique described above. Following the write operation, the buffer manager 214 inserts a read record into the RSDB 215. The read record specifies that storage units are written to memory banks 302e, 302d, 302b and 302a and in that order. When the port reads the storage units, the port reads in the same order by looking up the read record.

In some implementations, a read record includes a bit map that indicates which memory banks are written for the corresponding write operation. For example, each memory bank can be assigned one bit in the bit map. If the bit for a memory bank is set to a first bit value, then a storage unit was written to the memory bank in the write operation; if the bit for the memory bank is set to a second bit value, then no storage unit was written to the memory bank in the write operation. In some implementations, the first bit value is 1 and the second bit value is 0. Considering the example described above, in such implementations, the read record can specify the bit map shown in Table 1.

TABLE 1

| Memory Bank | Bank 0 302a | Bank 1 302b | Bank 2 302c | Bank 3 302d | Bank 4 302e |
|---|---|---|---|---|---|
| Bit Value | 1 | 1 | 0 | 1 | 1 |

In other implementations, the first bit value is 0 and the second bit value is 1.

In some implementations, a read record specifies the order explicitly. For example, the read record can include sequence numbers indicating the order in which the memory banks are to be read. Considering the example described above, in such implementations, the read record specifies the sequence number order as shown in Table 2.

TABLE 2

| Memory Bank | Bank 0 302a | Bank 1 302b | Bank 2 302c | Bank 3 302d | Bank 4 302e |
|---|---|---|---|---|---|
| Bit Value | 1 | 1 | 0 | 1 | 1 |
| Sequence Number | 4 | 3 | — | 2 | 1 |

In some implementations, the read record specifies the order implicitly. For example, the read record can implicitly specify a left-to-right order. In such cases, the buffer manager 214 organizes the write operation such that storage units are written to the memory banks in the same left-to-right order. Considering the example described above, in such implementations, the buffer manager 214 writes, following the left-to-right order, to the memory banks 302a, 302b, 302d and 302e, and the read record specifies the same order. When the port reads the storage units, the port reads in the same implicit left-to-right order by looking up the read record. Other orders are also possible. For example, the read record can implicitly specify a right-to-left order in some cases.

In the above manner, the records in the RSDB 215 are used to ensure that output segments corresponding to data packets are sent out in the order in which storage units for corresponding input segments were written to the aggregated port buffer for a given port in a port group. The buffer manager 214 uses a read bank selection (RBS) technique to issue a read command to a memory bank specified by a read record in the RSDB 215. In the RBS technique, the buffer manager 214 determines, from a read record in the RSDB 215, the port associated with the read record. The buffer manager 214 then issues a read command to the port, which also specifies the order in which the port will read storage units from the memory banks, as described above.

In some implementations, the buffer manager 214 uses a FIFO order for reading the read records from the RSDB 215 for each port. In such cases, the buffer manager 214 processes read records for a port from the RSDB 215 in the first-in-first-out order, e.g., the order in which the read records for the port were written to the RSDB 215. This ensures that output segments are read by the ports in the same order in which input segments were written, such that there is no misordering of the packet data when being read by the ports. However, in other implementations, a different order for reading the read records from the RSDB 215 is used.

The ports in a port group are read from the aggregated port buffer based on scheduling performed by the port schedulers, e.g., port schedulers 218a, 218b and 218c. Each of the port schedulers controls the read order for the ports in the associated port group. For example, port scheduler 218a controls the order in which ports in the port group 206a read storage units from the corresponding aggregated port buffer 216a; port scheduler 218b controls the order in which ports in the port group 206b read storage units from the corresponding aggregated port buffer 216b; and port scheduler 218c controls the order in which ports in the port group 206c read storage units from the corresponding aggregated port buffer 216c.

In some implementations, each port scheduler, each of port schedulers 218a, 218b and 218c, uses a calendar-based scheduler, which uses a fixed number of slots. The port scheduler assigns each port to a slot. Each time a read operation occurs, the port scheduler looks up the next slot that is to be processed, and enables the port assigned to the slot to read storage units from the corresponding aggregated port buffer. The port scheduler cycles through all the assigned slots and services every port in the associated port group, before restarting at the first slot that has been previously serviced. For example, the port group 206c can include four ports. In such cases, the port scheduler 218c uses a calendar-based scheduler that has four slots: slots 0, 1, 2 and 3. The port scheduler 218c assigns the four ports to the slots 0, 1, 2 and 3, and cycles through the slots in that order during read operations.

In some implementations, different port schedulers use different numbers of slots. This can be the case, for example, when different port groups have varying numbers of ports. For example, port group 206a can have six ports; the port scheduler 218a can accordingly use a 6-slot scheduler. In contrast, port group 206b can have three ports, and the port scheduler 218b can accordingly use a 3-slot scheduler; and port group 206c can have four ports, and the port scheduler 218c can accordingly use a 4-slot scheduler. However, in other implementations, different port schedulers use the same number of slots. This is the case, for example, when different port groups have the same number of ports.

When a port is selected to perform a read operation, the port scheduler consults with the buffer manager 214 to determine the memory banks that include the storage units to be read by the port, and the order in which the memory banks are to be read, as described above with respect to the RSDB 215.

As noted previously, in some implementations, the ports assigned to a port group are dynamically changed during runtime. In such implementations, the associated port scheduler reconfigures the scheduler that the ports use to read from the corresponding aggregated port buffer. For example, the port group 206c can initially include four 10 Gbps ports—ports 0, 1, 2, and 3—which are assigned to slots 0, 1, 2 and 3 respectively. During runtime, the ports in the port group 206c are reconfigured to include one 20 Gbps port (port 0) and two 10 Gbps ports (ports 1 and 2). In such a case, the port scheduler 218c can dynamically change the slot assignment as shown in Table 3.

TABLE 3

| Slot | Port |
| --- | --- |
| 0 | Port 0 |
| 1 | Port 1 |
| 2 | Port 0 |
| 3 | Port 2 |

Accordingly, in one complete cycle of the calendar-based scheduler, the 20 Gbps port 0 is serviced at twice the frequency of the 10 Gbps ports 1 and 2, which is proportional to their respective data rates.

In some implementations, in assigning ports of different data rates to slots in the calendar-based scheduler, the port scheduler assigns the ports to slots that are equally spaced in the sequence. In the example illustrated above, the slots for ports 1 and 2 remain unchanged while updating the scheduler, while the assignments for ports that are reconfigured are updated. In doing so, the port scheduler ensures that the amount of jitter that is introduced is minimized. Otherwise, the frequency at which a particular port is serviced would dynamically vary, resulting in jitter. For example, jitter, which relates to the time delay between transmissions of any two segment to a port group, can be introduced by an arriving packet data that just missed the slot assigned to the destination port in the calendar-based scheduler and the wait time to the next assigned slot is not uniformly spaced. As an illustrative example, consider two calendar-based scheduling sequences for ports P0, P1, P2 and P3, which can be ports in any of port groups 206a, 206b or 206c: In the first sequence, the slot assignments for ports are not equally spaced, with the ports being serviced in the following order: P0, P0, P1, P1, P2, P2, P3, P3. In the second sequence, the slot assignments for the ports are equally spaced, with the ports being serviced in the following order: P0, P1, P2, P3, P0, P1, P2, P3. If data arrived for port P0 as port P1 was being serviced for the first time in the first sequence, the data would have to wait for five additional slots, e.g., slots for P1, P2, P2, P3, P3, before being serviced in a slot assigned to P0. However, in the second sequence, the data would have to wait at most two additional slots, e.g., slots for P2, P3, before being serviced. By assigning ports to slots that are equally spaced in sequence, e.g., as in the second sequence, using the calendar-based scheduler, the port scheduler reduces jitter.

Figure 4:
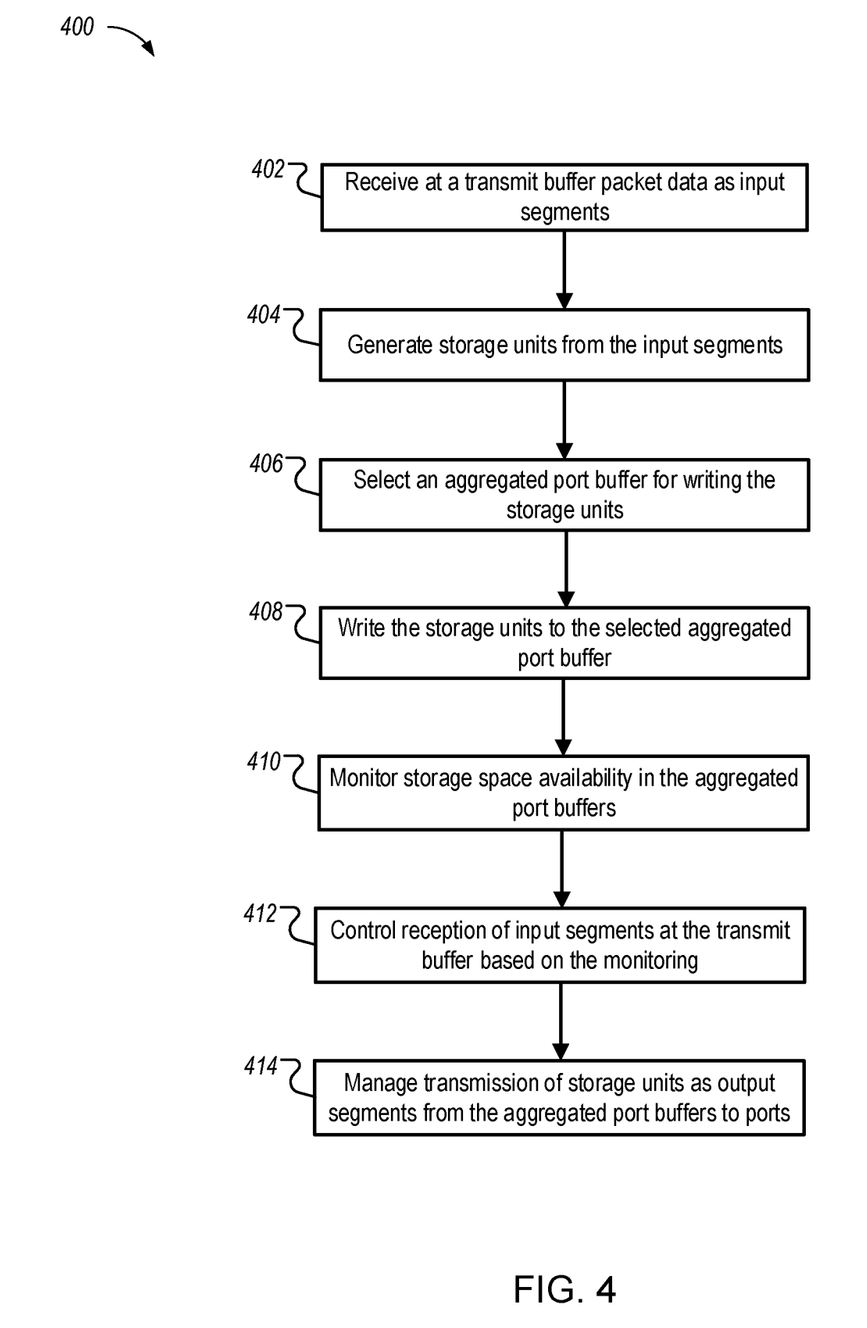
FIG. 4 illustrates an example process to buffer packet data using a transmit buffer.

FIG. 4 illustrates an example process 400 to buffer packet data using a transmit buffer. In some implementations, the process 400 is performed by the transmit buffer 202 when forwarding packet data sent by the aggregated packet processor 204 to one or more port groups, e.g., 206a, 206b or 206c. Accordingly, the following sections describe the process 400 with respect to the transmit buffer 202, the aggregated packet processor 204 and the port groups 206a, 206b and 206c. However, in other implementations, the process 400 may be performed by other systems or devices.

The process 400 starts at 402, when packet data is received as input segments at a transmit buffer. For example, the packing unit 212 receives interleaved input segments corresponding to packet data from the aggregated packet processor 204.

At 404, storage units are generated from the input segments. For example, the packing unit 212 divides the input segments, each of size S, into storage units of size M each, where S>M, as described previously. The packing unit sends the storage units to the buffer manager 214 for writing to the aggregated port buffers in the transmit buffer 202.

At 406, an aggregated port buffer is selected for writing the storage units. For example, the buffer manager 214 receives the storage units from the packing unit 212 and determines, based on the intended destination port for the storage units, which aggregated port buffer to write the storage units to. For example, if one or more storage units are destined for a port in port group 206a, the buffer manager selects aggregated port buffer 216a for writing the storage units. On the other hand, if one or more storage units are destined for a port in port group 206b, the buffer manager selects aggregated port buffer 216b for writing the storage units.

At 408, the storage units are written to the selected aggregated port buffer. For example, upon selecting an aggregated port buffer based on the intended destination port for the packet data, the buffer manager 214 writes the corresponding storage units to memory banks in the selected aggregated port buffer. As described previously, in some implementations, the buffer manager 214 uses WBS techniques for writing the storage units to the memory banks.

At 410, storage space availability in the aggregated port buffers is monitored. For example, the buffer manager 214 monitors the availability of storage space in the memory banks of the aggregated port buffers 216a, 216b and 216c. The buffer manager uses WCM techniques to check when storage units are written for each port in the corresponding aggregated port buffer, and/or when storage units are read by the ports, and the change in available space in the aggregated port buffers.

At 412, reception of input segments at the transmit buffer is controlled based on the monitoring. For example, based on monitoring the availability of storage space for each port in the aggregated port buffers using WCM techniques, the buffer manager 214 determines whether to return transmission credits to the upstream data source, e.g., data source 208. By managing transmission credits using WCM techniques as described previously, the buffer manager 214 controls the rate at which the data source 208 sends packet data as input segments, which are received at the transmit buffer 202 from the aggregated packet processor 204.

At 414, transmission of storage units as output segments from the aggregated port buffers to ports is managed. For example, the buffer manager 214 coordinates with one or more port schedulers, e.g., port schedulers 218a, 218b or 218c, to schedule reading of storage units from the aggregated port buffers 216a, 216b or 216c, respectively, by ports in the port groups 206a, 206b or 206c, respectively. As described previously, the ports read the storage units as output segments of size R, where S≥R. The buffer manager 214 uses the RSDB 215 and RBS techniques to determine the order in which storage units are to be read by a port in a read operation.

The processes and logic flows described in this document can be performed by one or more programmable processors executing one or more computer programs to perform the functions described herein. The processes and logic flows can also be performed by, and apparatus can also be implemented as, special purpose logic circuitry, e.g., a field programmable gate array (FPGA) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A device, comprising:
    a packing unit;
    a buffer manager; and
    a plurality of aggregated port buffers each coupled to receive output from the packing unit;
    wherein:
        the packing unit is configured to:
            receive, from an aggregated packet processor, packet data as input segments of a first size, wherein the aggregated packet processor is configured to receive packet data from an external source and segment the packet data into the input segments for forwarding to the packing unit;
            generate, from one or more input segments, storage units of a second size; and
            for each storage unit:
                receive information from the buffer manager identifying a particular aggregated port buffer from the plurality of aggregated port buffers for storing the storage unit, and
                write the storage unit to particular aggregated port buffer; and
        the buffer manager is configured to:
            for each storage unit, select, from the plurality of aggregated port buffers, a particular aggregated port buffer, and send information to the buffer manager for writing the storage unit to the particular aggregated port buffer;
            monitor availability of storage space in the aggregated port buffers;
            based on the availability of storage space, control reception of input segments at the device; and
            manage transmission of the storage units from the aggregated port buffers to one or more external destinations as output segments of a third size.

2. The device of claim 1, wherein:
    each aggregated port buffer of the plurality of aggregated port buffers includes a plurality of memory banks and is configured to:

enable simultaneous read access to a first subset of the memory banks included in the aggregated port buffer; and enable simultaneous write access to a second subset of the memory banks included in the aggregated port buffer, wherein the first subset of the memory banks is disjoint from the second subset of the memory banks.

3. The device of claim 2, wherein each memory bank of each plurality of memory banks is made up of single port memory components.

4. The device of claim 2, further comprising:

a plurality of port schedulers, each port scheduler coupled to an output of an aggregated port buffer and configured to:

select, from a group of ports coupled to an output of the port scheduler, a particular port for issuing a read command to the aggregated port buffer corresponding to the port scheduler.

5. The device of claim 4, wherein each port scheduler is further configured to:

assign, using calendar-based scheduling, each port in the group of ports associated with the port scheduler to a slot in a known number of slots; and for each read operation of the packet data from the aggregated port buffer corresponding to the port scheduler, select a port assigned to a next slot in the known number of slots.

6. The device of claim 5, wherein each port scheduler is further configured to:

dynamically reconfigure the ports assigned to the group of ports associated with the port scheduler from a first number of ports sharing a bandwidth of the group of ports to a second different number of ports sharing the bandwidth of the group of ports, and wherein the dynamic reconfiguration comprises modifying the assignment of the ports in the group of ports associated with the port scheduler to the slots in the known number of slots.

7. The device of claim 1, wherein the packing unit includes a packing buffer that stores data of size less than the second size, and wherein the packing unit is configured to:

receive an input segment;

combine a portion of the input segment with the data stored in the packing buffer to generate a storage unit of the second size; and write the storage unit to a particular aggregated port buffer.

8. The device of claim 1, wherein the packing unit is further configured to:

receive an instruction from the aggregated packet processor to duplicate one or more particular input segments that are sent from the aggregated packet processor to the packing unit;

in response to the instruction:

generate storage units corresponding to the one or more particular input segments, and generate duplicate copies of the storage units corresponding to the one or more particular input segments; and write the storage units corresponding to the one or more particular input segments and the duplicated copies in one or more aggregated port buffers.

9. The device of claim 1, wherein each aggregated port buffer includes a plurality of memory banks, and wherein the buffer manager is configured to:

determine one or more memory banks in the particular aggregated port buffer from which storage units are being read for transmission to one or more external destinations; and select one of remaining memory banks in the particular aggregated port buffer for writing a storage unit to the particular aggregated port buffer.

10. The device of claim 9, wherein selecting one of the remaining memory banks comprises:

determining a number of storage units stored in each of the remaining memory banks; and selecting one of the remaining memory banks that stores a least number of storage units relative to the other remaining memory banks.

11. The device of claim 9, wherein the buffer manager is configured to:

in response to writing one or more storage units to one or more of the remaining memory banks included in the particular aggregated port buffer, store a read record in a database in the buffer manager that specifies the one or more of the remaining memory banks that were written with the one or more storage units and an order in which the one or more storage units were written to the one or more of the remaining memory banks.

12. The device of claim 11, wherein specifying the order in which the one or more storage units were written to the one or more of the remaining memory banks comprises one of:

providing sequence numbers for the one or more of the remaining memory banks corresponding to the order in which the one or more of the remaining memory banks were written, or writing the one or more storage units to the remaining memory banks in a preselected directional arrangement of the remaining memory banks.

13. The device of claim 11, wherein in managing the transmission of the storage units from the plurality of aggregated port buffers to one or more external destinations as output segments, the buffer manager is configured to:

determine, from the database, the order in which the one or more storage units were written to the one or more of the remaining memory banks; and enable reading of the one or more storage units from the one or more of the remaining memory banks in the determined order.

14. The device of claim 1, wherein, to control reception of input segments at the device, the buffer manager is configured to:

for each aggregated port buffer, monitor reading of storage units stored in the aggregated port buffer by a group of ports associated with the aggregated port buffer and detect when a particular port in the group of ports reads one or more storage units from the aggregated port buffer;

determine whether space allocated to the particular port has increased in the aggregated port buffer by an amount equal to at least the first size of an input segment, as a result of the reading by the particular port; and in response to determining that space allocated to the particular port has increased in the aggregated port buffer, send, to an external source, information that provides a transmission credit to the external source to send a new input segment to the particular port.

15. The device of claim 1, further comprising:
the aggregated packet processor having an output coupled to an input of the packing unit, wherein the aggregated packet processor is configured to:
forward a stream of interleaved input segments to the packing unit, wherein the interleaved input segments correspond to the packet data destined for the one or more external destinations.

16. The device of claim 1, further comprising:
a transmit buffer, the transmit buffer comprising the packing unit, the buffer manager and the plurality of aggregated port buffers, and wherein the transmit buffer further comprises a plurality of port schedulers, each port scheduler coupled to an output of an aggregated port buffer, wherein:
each aggregated port buffer includes a plurality of memory banks and is configured to:
enable simultaneous read access to a first subset of the memory banks included in the aggregated port buffer; and
enable simultaneous write access to a second subset of the memory banks included in the aggregated port buffer, wherein the first subset of the memory banks is disjoint from the second subset of the memory banks; and
each port scheduler is configured to:
select, from a group of ports coupled to an output of the port scheduler, a particular port for reading packet data from the aggregated port buffer corresponding to the port scheduler.

17. The device of claim 16, wherein each port scheduler is further configured to:
assign, using calendar-based scheduling, each port in the group of ports associated with the port scheduler to a slot in a known number of slots; and
for each read operation of the packet data from the aggregated port buffer corresponding to the port scheduler, select a port assigned to a next slot in the known number of slots.

18. The device of claim 17, wherein each port scheduler is further configured to:
dynamically reconfigure a first number of ports associated with the port scheduler to a second number of ports associated with the port scheduler, wherein the first number is different from the second number and a bandwidth associated with at least a subset of the first number of ports is different from a bandwidth associated with at least a subset of the second number of ports, and
wherein the dynamic reconfiguration comprises modifying the assignment of the ports in the group of ports associated with the port scheduler to the slots in the known number of slots.

19. The device of claim 16, wherein the packing unit includes a packing buffer that stores data of size less than the second size, and wherein the packing unit is configured to:
receive an input segment;
combine a portion of the input segment with the data stored in the packing buffer to generate a storage unit of the second size; and
write the storage unit to manager particular aggregated port buffer.

20. The device of claim 16, wherein the buffer manager is configured to:
determine one or more memory banks in the particular aggregated port buffer from which storage units are being read for transmission to one or more external destinations; and
select one of remaining memory banks in the particular aggregated port buffer for writing a storage unit to the particular aggregated port buffer.

21. The device of claim 20, wherein selecting one of the remaining memory banks comprises:
determining a number of storage units stored in each of the remaining memory banks; and
selecting one of the remaining memory banks that stores a least number of storage units relative to the other remaining memory banks.

22. The device of claim 20, wherein the buffer manager is configured to:
in response to writing one or more storage units to one or more of the remaining memory banks included in the particular aggregated port buffer, store a read record in a database in the buffer manager that specifies the one or more of the remaining memory banks that were written with the one or more storage units and an order in which the one or more storage units were written to the one or more of the remaining memory banks.

23. The device of claim 22, wherein in managing the transmission of the storage units from the plurality of aggregated port buffers to one or more external destinations as output segments, the buffer manager is configured to:
determine, from the database, the order in which the one or more storage units were written to the one or more of the remaining memory banks; and
enable reading of the one or more storage units from the one or more of the remaining memory banks in the determined order.

24. The device of claim 16, wherein, to control reception of input segments at the device, the buffer manager is configured to:
for each aggregated port buffer, monitor reading of storage units stored in the aggregated port buffer by a group of ports associated with the aggregated port buffer and detect when a particular port in the group of ports reads one or more storage units from the aggregated port buffer;
determine whether space allocated to the particular port has increased in the aggregated port buffer by an amount equal to at least the first size of an input segment, as a result of the reading by the particular port; and
in response to determining that space allocated to the particular port has increased in the aggregated port buffer, send, to an external source, information that provides a transmission credit to the external source to send a new input segment to the particular port.

25. The device of claim 16, wherein the packing unit is configured to:
receive an instruction from the aggregated packet processor to duplicate one or more particular input segments that are received from the aggregated packet processor by the packing unit;
in response to the instruction:
generate storage units corresponding to the one or more particular input segments, and
generate duplicate copies of the storage units corresponding to the one or more particular input segments; and
write the storage units corresponding to the one or more particular input segments and the duplicated copies in one or more aggregated port buffers.

26. A method comprising:
receiving, in a network device from an aggregated packet processor, packet data as input segments of a first size, wherein the aggregated packet processor is configured to receive packet data from an external source and segment the packet data into the input segments for forwarding to the network device and wherein the network device includes a plurality of aggregated port buffers;

generating, in the network device, from one or more input segments, storage units of a second size;

for each storage unit:
  selecting, in the network device, a particular aggregated port buffer of the plurality of aggregated port buffers, and
  writing, in the network device, the storage unit to the particular aggregated port buffer;

monitoring, by the network device, availability of storage space in the plurality of aggregated port buffers;

based on the availability of storage space, controlling, by the network device, reception of input segments at the network device; and managing, by the network device, transmission of the storage units from the plurality of aggregated port buffers to one or more external destinations as output segments of a third size.

27. The method of claim 26, wherein an aggregated port buffer includes a plurality of memory banks, the method further comprising:
  enabling simultaneous read access to a first subset of the memory banks included in the particular aggregated port buffer; and
  enabling simultaneous write access to a second subset of the memory banks included in the particular aggregated port buffer,
  wherein the first subset of the memory banks is disjoint from the second subset of the memory banks.

28. The method of claim 27, further comprising:
  selecting a particular port from a group of ports associated with an aggregated port buffer of the plurality of aggregated port buffers, the particular port selected for issuing a read command to the aggregated port buffer;
  assigning, using calendar-based scheduling, each port in the group of ports to a slot in a known number of slots; and
  for each read operation of the packet data from the aggregated port buffer, selecting a port assigned to a next slot in the known number of slots.

29. The method of claim 26, wherein each aggregated port buffer of the plurality of aggregated port buffers includes a plurality of memory banks, the method further comprising:
  determining, by the network device, one or more memory banks in the particular aggregated port buffer from which storage units are being read for transmission to one or more external destinations;
  selecting one of remaining memory banks in the particular aggregated port buffer for writing a storage unit to the particular aggregated port buffer, wherein selecting one of the remaining memory banks comprises:
  determining a number of storage units stored in each of the remaining memory banks, and
  selecting one of the remaining memory banks that stores a least number of storage units relative to the other remaining memory banks; and
  in response to writing one or more storage units to one or more of the remaining memory banks included in the particular aggregated port buffer, storing a read record in a database in the network device that specifies the one or more of the remaining memory banks that were written with the one or more storage units and an order in which the one or more storage units were written to the one or more of the remaining memory banks.

30. The method of claim 26, wherein receiving the input segments at the network device comprises:
  for each aggregated port buffer of the plurality of aggregated port buffers, monitoring reading of storage units stored in the aggregated port buffer by a group of ports associated with the aggregated port buffer and detecting when a particular port in the group of ports reads one or more storage units from the aggregated port buffer;
  determining whether space allocated to the particular port has increased in the aggregated port buffer by an amount equal to at least the first size of an input segment, as a result of the reading by the particular port; and
  in response to determining that space allocated to the particular port has increased in the aggregated port buffer, sending information to an external source that provides a transmission credit to the external source to send a new input segment to the particular port.

* * * * *